United States Patent
Oriol et al.

(10) Patent No.: US 12,158,109 B2
(45) Date of Patent: Dec. 3, 2024

(54) AIRCRAFT TURBINE ENGINE ASSEMBLY COMPRISING A PASSIVE VALVE FOR BY-PASSING A FUEL/OIL HEAT EXCHANGER

(71) Applicant: SAFRAN AIRCRAFT ENGINES, Paris (FR)

(72) Inventors: Sébastien Oriol, Moissy-Cramayel (FR); Nicolas Vincent Pierre-Yves Cotereau, Moissy-Cramayel (FR); Mohammed-Lamine Boutaleb, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/253,791

(22) PCT Filed: Nov. 30, 2021

(86) PCT No.: PCT/FR2021/052150
§ 371 (c)(1),
(2) Date: May 22, 2023

(87) PCT Pub. No.: WO2022/117947
PCT Pub. Date: Jun. 9, 2022

(65) Prior Publication Data
US 2024/0003299 A1     Jan. 4, 2024

(30) Foreign Application Priority Data

Dec. 1, 2020 (FR) ........................ 2012469

(51) Int. Cl.
*F02C 7/224* (2006.01)
*F02C 7/14* (2006.01)
(Continued)

(52) U.S. Cl.
CPC ............... *F02C 7/224* (2013.01); *F02C 7/14* (2013.01); *F16K 17/046* (2013.01);
(Continued)

(58) Field of Classification Search
CPC .. F02C 7/224; F02C 7/16; F02C 7/232; F28F 2265/16; F28F 2265/06; F28F 27/02; F16K 17/046; F16K 17/082
(Continued)

(56) References Cited

U.S. PATENT DOCUMENTS 2,731,239 A * 1/1956 Andersen .................. F01P 11/08
244/57
2,925,712 A * 2/1960 William ................... F02C 7/224
60/785
(Continued)

FOREIGN PATENT DOCUMENTS

EP      0 721 061 A1    7/1996
FR      2 690 710 A1    11/1993
(Continued)

OTHER PUBLICATIONS

International Search Report mailed on Feb. 22, 2022 in PCT/FR2021/052150 filed on Nov. 30, 2021 (2 pages).

*Primary Examiner* — Ehud Gartenberg
*Assistant Examiner* — Jingchen Liu
(74) *Attorney, Agent, or Firm* — Oblon, McClelland, Maier & Neustadt, L.L.P.

(57) ABSTRACT

An aircraft turbine engine assembly, including a lubricating oil circuit and a fuel supply device, the assembly also including a passive bypass valve enabling the oil to bypass an exchanger, the valve including a valve body and a piston arranged to move in a sliding space defining a first actuating chamber supplied with oil from the oil circuit, as well as a second actuating chamber supplied with fuel from the
(Continued)

device, the valve being configured so that when the differential pressure between the oil pressure in the first actuating chamber and the fuel pressure in the second actuating chamber drops below a predetermined value of differential pressure, the piston moves from a normal operating position to an exchanger bypass position.

12 Claims, 4 Drawing Sheets

(51) Int. Cl.
*F16K 17/04* (2006.01)
*F16K 17/08* (2006.01)
*F28F 27/02* (2006.01)

(52) U.S. Cl.
CPC ............ *F16K 17/082* (2013.01); *F28F 27/02* (2013.01); *F28F 2265/06* (2013.01); *F28F 2265/16* (2013.01)

(58) Field of Classification Search
USPC .......................................................... 417/228
See application file for complete search history.

(56) References Cited

U.S. PATENT DOCUMENTS

| | | | | |
|---|---|---|---|---|
| 3,770,050 A * | 11/1973 | Nakanishi | ................... | F25J 5/00 165/DIG. 100 |
| 4,759,401 A * | 7/1988 | Pfouts | .................... | F01M 5/002 60/39.08 |
| 10,018,117 B2 * | 7/2018 | Mottet | .................... | F16K 47/08 |
| 10,072,902 B2 * | 9/2018 | Sheppard | ................ | F16K 11/22 |
| 2008/0289338 A1 * | 11/2008 | Desai | ...................... | F04C 14/02 60/734 |
| 2009/0026405 A1 * | 1/2009 | Sheppard | ........... | G05D 23/1333 251/364 |
| 2010/0213401 A1 * | 8/2010 | Martin | ................ | F16H 57/0413 251/324 |
| 2012/0324859 A1 * | 12/2012 | Foster | .................... | F28F 13/12 60/39.01 |
| 2016/0128238 A1 * | 5/2016 | Shedd | .................... | F25B 41/42 361/679.47 |

FOREIGN PATENT DOCUMENTS

| | | |
|---|---|---|
| FR | 2 914 365 A1 | 10/2008 |
| FR | 3 001 253 A1 | 7/2014 |
| FR | 3 068 102 A1 | 12/2018 |
| FR | 3 088 956 A1 | 5/2020 |
| WO | WO 2012/093235 A1 | 7/2012 |

* cited by examiner

AIRCRAFT TURBINE ENGINE ASSEMBLY COMPRISING A PASSIVE VALVE FOR BY-PASSING A FUEL/OIL HEAT EXCHANGER

TECHNICAL FIELD

The present invention pertains to the field of aircraft turbine engines, such as turbojet engines and turboprop engines. More specifically, it relates to the fuel/oil heat exchangers equipping such turbine engines.

PRIOR ART

An aircraft turbine engine is generally equipped with a plurality of fuel/oil heat exchangers, which make it possible to transfer the thermal rejections from the engine, recovered by the oil, towards the fuel then serving as cold source within the exchanger. The fuel heated by the oil is then sent into the combustion chamber of the turbine engine, which makes it possible to reuse a portion of the calorific power transferred in order to improve the combustion efficiency.

One or more fuel/oil heat exchangers may thus be arranged at the junction between a lubricating oil circuit, and a fuel supply device. The lubricating oil circuit includes conventional elements such as one or more oil tanks, a lubricating unit, comprising at least one oil pump, one oil filter, one or more enclosures to be pressurised, etc.

Moreover, the fuel supply device of the turbine engine usually includes a fuel supply circuit of the combustion chamber, as well as a bypass circuit for supplying the hydraulic systems with pressurised fuel such as hydraulic fluid. Indeed, aircraft turbine engines include many adjustable members with variable geometry, such as thrust reversers, or variable pitch stator blades, but also flaps, air cooling valves or clearance regulation valves. To actuate these members, it is effectively common to use hydraulic actuators, that is to say any hydraulic system using a differential pressure in an actuating fluid to actuate a work in a mechanical member, thus including hydraulic cylinders and servovalve hydraulic controls. The hydraulic fluid actuating these systems may therefore be pressurised fuel, coming from the fuel supply device of the turbine engine.

In most turbine engine architectures, the fuel/oil exchanger is in a place that generates a fuel pressure level higher than that of the oil. Consequently, due to the differential pressure observed in the exchanger, a degradation of the latter may lead to a fuel leak towards the lubricating oil circuit. This case of leak is commonly called "Fuel-in-Oil". It constitutes a particularly feared scenario, because it may result in significant damage on the turbine engine. The risk mainly lies in the fact that in the case of a leak, fuel may mix with the oil and reach the enclosures of the engine at high temperature, with a risk of spontaneous ignition of the fuel, then of fire, by combustion of the oil in the enclosures. In the prior art, a plurality of solutions have been proposed to prevent the damage that could be caused by the increase in the volume of fluid in the oil circuit, in the case of "Fuel-in-Oil" leak. One of these solutions is known for example from document FR 3 068 102 A1.

Other technical solutions have been proposed more recently, implementing architectures wherein the pressure levels in the oil circuit are higher than those of conventional oil circuits. Thus, in the fuel/oil heat exchanger, the oil is at a pressure higher than that of the fuel. In these architectures, there is only a risk of reverse leak, called "Oil-in-Fuel". But even in the case of degradation of this "Oil-in-Fuel" leak phenomenon, the impact on the engine remains negligible in comparison to the reverse "Fuel-in-Oil" leak risk. However, the amount of oil available in the tank of the lubricating oil circuit remains limited. If this leak occurs over a long period and/or with a high flow, it is likely to result in drainage of the tank, and therefore a significant drop of the pressure levels in the oil circuit. This phenomenon may then cause an inversion of the differential pressure between the oil and the fuel in the exchanger, and the oil circuit would then become vulnerable again to the critical "Fuel-in-Oil" leak risk.

In order to limit the risk of inversion of the differential pressure between the oil and the fuel in the exchanger, it is possible to increase the amount of oil as well as the size of the enclosures to be pressurised in the oil circuit. However, these solutions have an impact in terms of mass.

DESCRIPTION OF THE INVENTION

In order to at least partially answer the drawbacks described above, the object of the invention is firstly an aircraft turbine engine assembly, comprising a lubricating oil circuit as well as a fuel supply device of the turbine engine, the oil circuit and the fuel supply device having in common a fuel/oil heat exchanger.

According to the invention, the assembly also includes a passive bypass valve enabling the oil of the lubricating oil circuit to bypass the exchanger, the bypass valve comprising a valve body as well as a piston arranged to move in a sliding space made in the valve body, the sliding space defining, respectively on either side of the piston, a first actuating chamber supplied with oil from the oil circuit, as well as a second actuating chamber supplied with fuel from the fuel supply device, the bypass valve being configured so that when the differential pressure between the oil pressure in the first actuating chamber and the fuel pressure in the second actuating chamber drops below a predetermined differential pressure value, the piston moves from a normal operating position allowing the oil of the oil circuit to pass through the valve in the direction of the heat exchanger, to a bypass position prohibiting this oil from circulating in the direction of the heat exchanger.

The invention thus proposes a simple and reliable solution to solve the problem of leak risk in the fuel/oil heat exchangers of aircraft turbine engines. In particular, the reliability comes from the passive nature of the bypass valve of the exchanger, since its piston forms an actuating member controlled directly and hydraulically by the oil and fuel pressures.

For the design of the bypass valve, the predetermined differential pressure value between the oil and the fuel is determined in such a way as to convey an abnormal case of drop of pressure of the oil relative to that of the fuel, and preferably a case where the differential pressure reverses between the oil and the fuel. Such a situation is indeed likely to generate a "Fuel-in-Oil" leak in the exchanger, but it is advantageously prevented by the immediate actuation of the piston in its bypass position, enabling the oil to bypass the exchanger and thus prevent its risk of contamination by the fuel.

Finally, it is noted that by being coupled with an architecture guaranteeing an oil pressure higher than the fuel pressure in the exchanger, the bypass valve implemented in the invention makes it possible to overcome the size constraints of the oil enclosures of the engine, without in as much risking "Fuel-in-Oil" leaks. Advantageously, this results in increased safety, without negative impact on the mass of the assembly.

Moreover, the invention has at least one of the following optional features, considered separately or in combination.

Preferably, the bypass valve in addition includes an elastic return means forcing the piston towards its bypass position, the elastic return means preferably being a compression spring. The force developed by this elastic return means on the piston thus adds to the forces resulting from the differential pressure applied by the oil and the fuel. In particular, its presence makes it possible to generate a movement of the piston, in its bypass position, at the moment of the equalisation of the pressures between the oil and the fuel, or even before this equalisation, when the pressure of the oil still remains slightly higher than that of the fuel. This elastic return means may also serve to compensate any pressure losses, in particular in the exchanger. Due to the possibility of freely determining its calibration, it more generally constitutes an additional degree of freedom in the design of the assembly.

Preferably, the bypass valve is a spool piston valve. Other valve designs are nevertheless possible, without departing from the scope of the invention.

Preferably, the bypass valve includes:

the spool piston, including a first annular oil passage as well as a second annular oil passage axially separated from one another;

a first oil inlet and a first oil outlet each opening into the sliding space of the valve body, the first oil inlet and outlet communicating with one another by means of the first annular oil passage when the piston adopts its normal operating position, the first oil outlet communicating with an oil intake of the heat exchanger;

a second oil inlet and a second oil outlet each opening into the sliding space of the valve body, the second oil inlet and outlet communicating with one another by means of the second annular oil passage when the piston adopts its normal operating position, the second oil inlet communicating with an oil exhaust of the heat exchanger;

and in the bypass position of the spool piston, it:

prohibits the communication between the first oil inlet and outlet;

prohibits the communication between the second oil inlet and outlet;

ensures the communication between the first oil inlet and the second oil outlet, by means of the first or of the second annular oil passage.

Preferably, the bypass valve further includes a third oil inlet opening into the first actuating chamber, as well as a fuel inlet opening into the second actuating chamber. Preferably, the third oil inlet, opening into the first actuating chamber, communicates with the second oil outlet, or with the first oil inlet.

Preferably, the fuel inlet, opening into the second actuating chamber, communicates with a fuel intake of the heat exchanger, or with a fuel exhaust of this same exchanger. Preferably, the bypass valve includes a position sensor of its piston in the sliding space of the valve body.

Preferably, the lubricating oil circuit includes at least one enclosure to be lubricated, preferably a roller bearing enclosure and/or an oil enclosure of the accessory gearbox.

Finally, another object of the invention is an aircraft turbine engine including such an assembly, the turbine engine preferably being a turbojet engine.

Other advantages and features of the invention will appear in the non-limiting detailed description hereinbelow.

BRIEF DESCRIPTION OF THE DRAWINGS

This description will be given with reference to the appended drawings, wherein.

DETAILED DESCRIPTION OF PREFERRED EMBODIMENTS

Figure 1:
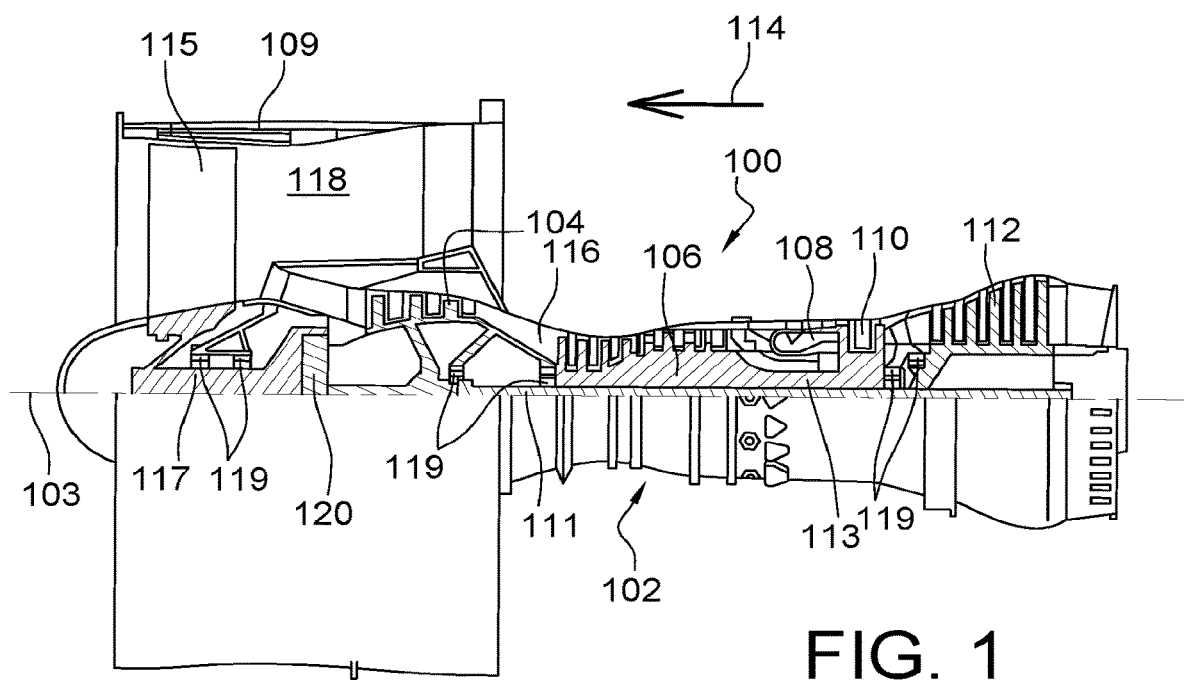
FIG. 1 shows a schematic side view of a turbojet engine according to the invention.

With reference to FIG. 1, a dual flow and dual body turbojet engine 100 is shown. The turbojet engine 100 conventionally includes a gas generator 102 on either side of which are arranged a low-pressure compressor 104, and a low-pressure turbine 112. The gas generator 102 comprises a high-pressure compressor 106, a combustion chamber 108 and a high-pressure turbine 110. In the following, the terms "front" and "back" are considered in a direction 114 opposite the main flow direction of the gases inside the turbojet engine, this direction 114 being parallel to the longitudinal axis 103 of the turbojet engine.

The low-pressure compressor 104 and the low-pressure turbine 112 form a low-pressure body, and are connected to one another by a low-pressure shaft 111 centred on the axis 103. Likewise, the high-pressure compressor 106 and the high-pressure turbine 110 form a high-pressure body, and are connected to one another by a high-pressure shaft 113 centred on the axis 103 and arranged about the low-pressure shaft 111. The shafts are supported by roller bearings 119, which are lubricated by being arranged in pressurised oil enclosures (not referenced in FIG. 1). The same applies for the fan hub 117, also supported by roller bearings 119 arranged in one or more pressurised oil enclosures. The turbojet engine 100 moreover includes, at the front of the gas generator 102 and the low-pressure compressor 104, a fan 115 that is here arranged directly behind an air inlet cone of the engine. The fan 115 is rotatable about the axis 103, and surrounded by a fan casing 109. This fan is preferably driven indirectly by the low-pressure shaft 111, via a reduction gear 120, which makes it possible to rotate with a slower speed.

Figure 2:
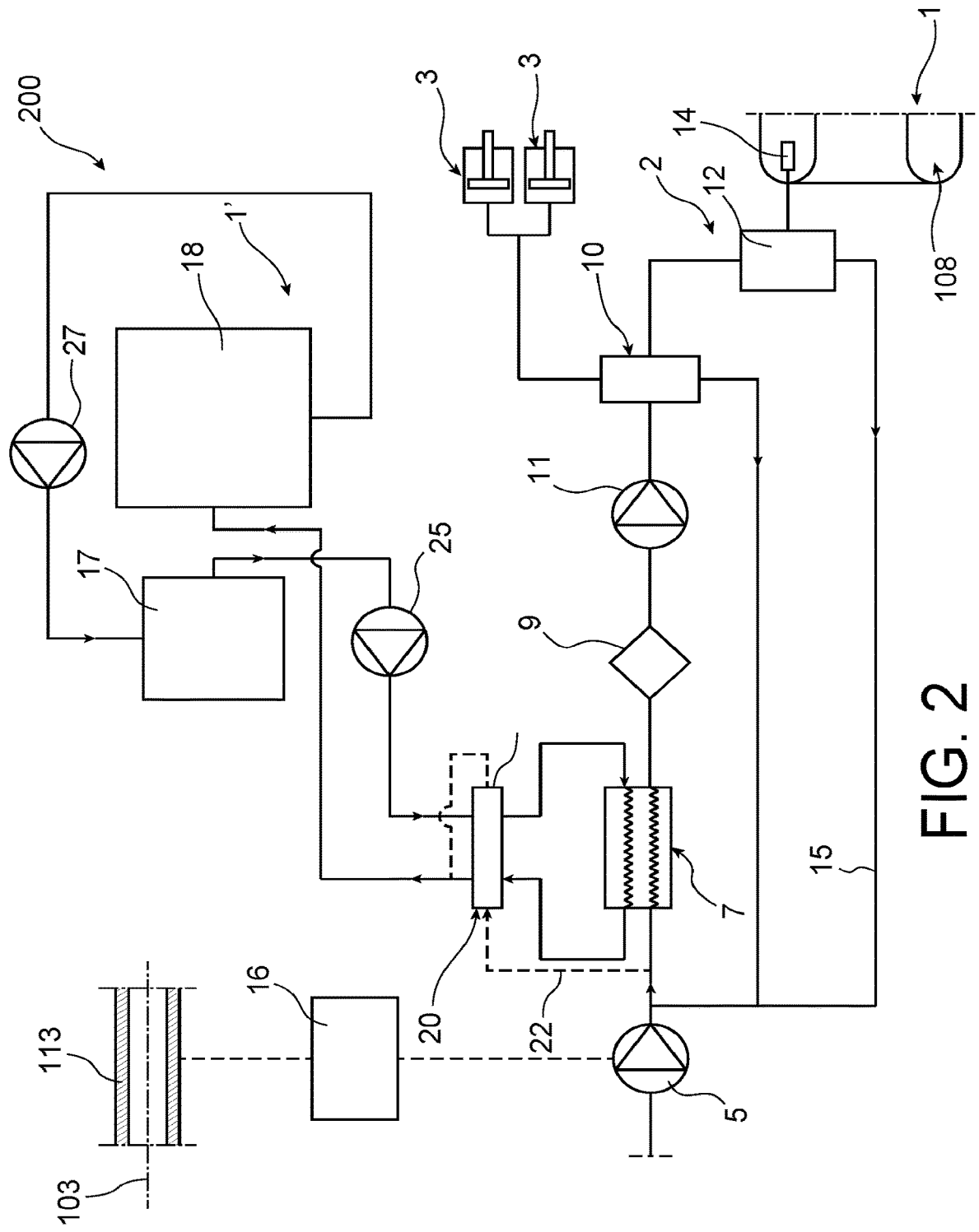
FIG. 2 shows a schematic view of an assembly according to a preferred embodiment of the invention, equipping the turbojet engine shown in the preceding figure.

Furthermore, the turbojet engine 100 defines a primary flow path 116 intended to be flowed through by a primary flow, as well as a secondary flow path 118 intended to be flowed through by a secondary flow located radially outwardly from the primary flow. FIG. 2 shows an assembly 200 of the turbojet engine shown in the preceding figure. It includes two sub-assemblies, namely a fuel supply device 1 of the turbojet engine, as well as a lubricating oil circuit 1'.

As regards the device 1, it is dedicated to supplying fuel to the combustion chamber 108, and hydraulic systems 3 such as hydraulic cylinders and servovalve hydraulic controls dedicated to controlling the variable geometries of the type of those mentioned above.

The device 1 includes a fuel supply circuit 2 of the combustion chamber 108. On this supply circuit 2 are installed in series, in the direction of circulation of the fuel, a low-pressure pump 5, a fuel/oil heat exchanger 7, a main fuel filter 9, a high-pressure pump 11, a control valve 10, and a fuel metering unit 12. The circuit 2 opens, downstream of the metering unit 12, onto injectors 14 in the combustion chamber 108.

The low-pressure pump 5 and the high-pressure pump 11 may be actuated by a shared shaft, preferably the high-pressure shaft 113, preferably via an accessory gearbox 16 of the turbine engine, referred to as "AGB". The high-pressure pump 11 may thus be a displacement pump, for example with gears. The low-pressure pump 5 may for its part be a kinetic pump, in particular a centrifugal pump.

The heat exchanger 7 makes it possible to cool the oil of the circuit 1' that will be described hereinafter, whereas the filter 9 makes it possible to stop the impurities that may cause potential damage and/or blockages to the fuel metering unit 12 or to the injectors 14. In a known manner, the fuel metering unit 12 meters the fuel flow supplied to the injectors 4 of the combustion chamber 108.

The supply device 1 also includes a fuel recovery circuit 15 connecting the fuel metering unit 12 to the supply circuit 2, preferably between the low-pressure pump 5 and the heat exchanger 7. The fuel flow excess supplied to the fuel metering unit 12 may thus be returned, through this recovery circuit 15, upstream of the heat exchanger 7. The control valve 10, or regulator, makes it possible to distribute the fuel flow between the combustion chamber 108 and the hydraulic systems 3.

The lubricating oil circuit 1' has only been shown partially since certain components have intentionally been removed for further clarity. In addition to the heat exchanger 7 that also belongs to the lubricating oil circuit 1', the latter includes an oil tank 17 as well as at least one pressurised chamber to be lubricated 18, such as a roller bearing enclosure or an oil enclosure of the accessory gearbox 16. The other components not shown of the oil circuit 1' are conventional, such as an oil pressurisation valve, an oil filter, etc. Between the oil tank 17 and the enclosure(s) to be lubricated 18, an oil supply pump 25, also referred to as main oil pump, is also provided, preferably arranged upstream of a bypass valve 20 that will be described hereinafter. Moreover, one or more oil recovery pumps 27 make it possible to return the oil recovered in the enclosures 18, towards the tank 17.

As mentioned above, the fuel/oil heat exchanger 7 makes it possible to transfer the thermal rejections of the engine, recovered by the oil coming out of the enclosure 18, towards the fuel then serving as cold source. Moreover, the fuel heated by the oil is subsequently sent into the combustion chamber 108, which makes it possible to improve the combustion efficiency.

The assembly 200 also includes a bypass valve 20, preferably integrated into the oil circuit 1' by being associated with the exchanger 7. This bypass valve 20 indeed makes it possible for the oil of the circuit 1', in certain operating conditions that will be detailed hereinafter, to circulate through this circuit 1' without passing through the exchanger 7, that is to say by bypassing it.

The bypass valve 20 is of passive nature, inasmuch as it is controlled hydraulically by the oil of the circuit 1' and by the fuel of the device 1. For this purpose, branch pipes 22, 23 make it possible to divert a portion of the oil and of the fuel towards the valve 20 to ensure its control, as will now be explained with reference to FIG. 3.

Figure 3:
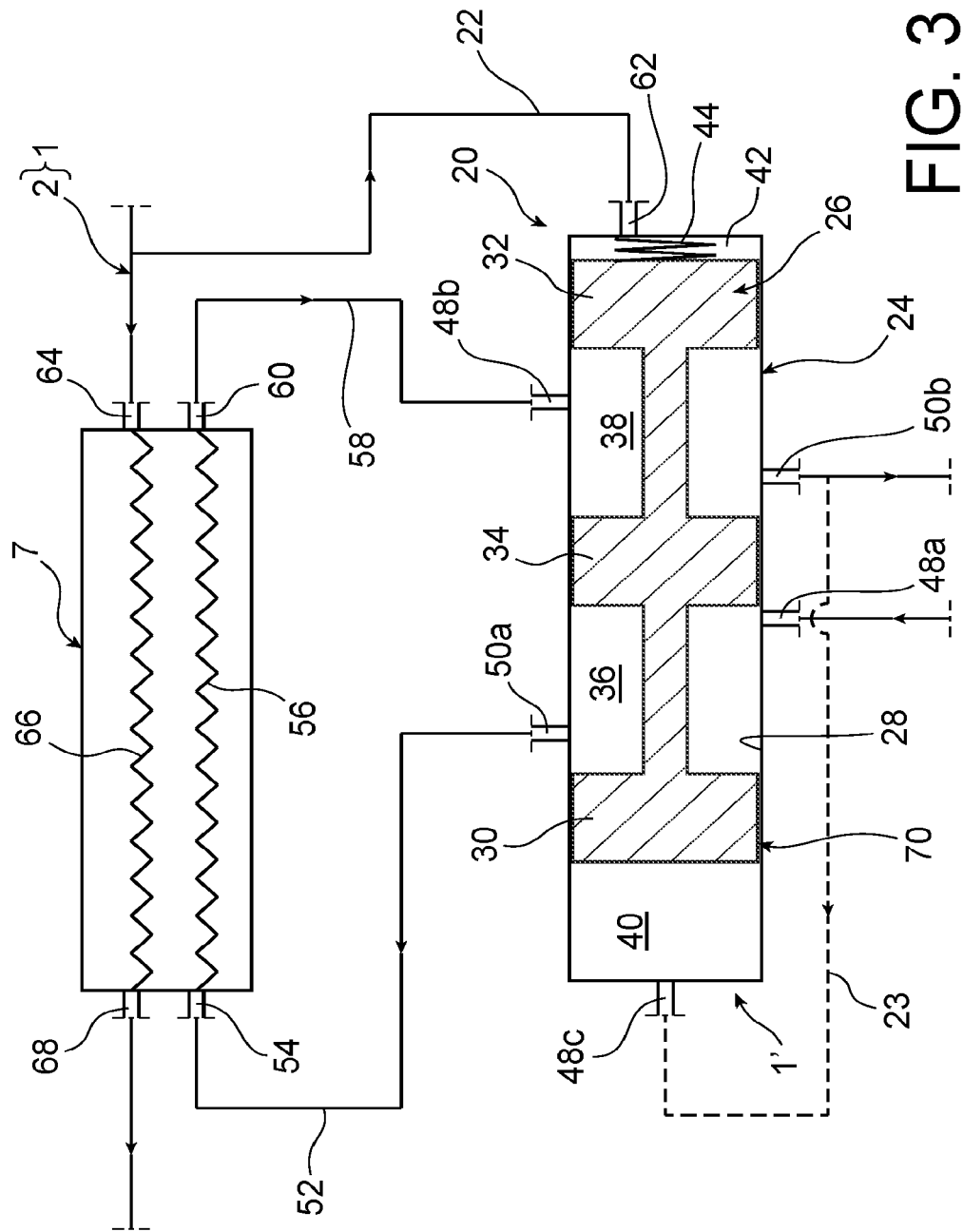
FIG. 3 is a more detailed view of a heat exchanger and of its bypass valve, equipping the assembly shown in FIG. 2, and shown with the piston of the valve occupying a normal operating position.

This FIG. 3 shows in a fairly schematic way the bypass valve 20, according to a preferred embodiment of the invention. The valve 20 includes a valve body 24, wherein a spool piston 26 is found controlled passively by the pressure of the fuel in the supply circuit 2 of the device 1, and by the oil pressure in the circuit 1'. The spool piston 26 is movably accommodated in a cylindrical sliding space 28, formed within the valve body 24. This piston 26 has a first solid end 30, axially opposite a second solid end 32. Between these two ends 30, 32, an intermediate solid portion 34 is provided, which separates a first annular oil passage 36 from a second annular oil passage 38. More specifically, the first oil passage 36 takes the form of an annular groove made at the outer surface of the spool piston 26, by being axially delimited by the first end 30 and by the intermediate solid portion 34. Similarly, the second oil passage 38 also takes the form of an annular groove made at the outer surface of the spool piston 26, by being axially delimited by the intermediate solid portion 34 and the second end 32 of the piston.

In the sliding space 28, the valve body 24 delimits, with the first end 30 of the piston, a first actuating oil chamber 40. Opposite, still in the sliding space 28, the valve body 24 delimits with the second end 32 of the piston, a second actuating chamber 42 supplied with fuel. Due to this design, the piston 26 is therefore subjected to a differential pressure between the oil and the fuel, which respectively exert forces on the first and second opposite ends 30, 32 of this piston. At this differential pressure, preferably a mechanical force is added resulting from a compression spring 44 one end of which is pressing against a bottom of the valve body 24, and the opposite end of which is pressing against the second end 32 of the piston, in order to force the latter in the direction of the first oil actuating chamber 40.

A plurality of hydraulic inlets and outlets open into the sliding space 28 of the piston 26. Firstly, this concerns a first oil inlet 48a and a first oil outlet 50a. The first oil inlet 48a is connected to the oil circuit 1', for example downstream of the enclosure to be lubricated, in order to be able to be supplied with oil coming from this enclosure. The first oil outlet 50a is connected by a pipe 52 to an oil intake 54, provided on the oil circuit 56 of the exchanger 7.

Subsequently, this concerns a second oil inlet 48b and a second oil outlet 50b, both axially offset from the first inlet and outlet 48a, 50a. The second oil outlet 48b is connected by a pipe 58 to an oil exhaust 60, provided on the oil circuit 56 of the exchanger 7. The second oil outlet 50b is for its part connected to the circuit 1', in such a way for example as to be able to send the oil back in the direction of the enclosures 18.

Finally, the bypass valve also includes a third oil inlet 48c opening into the first oil actuating chamber 40, as well as a fuel inlet 62 opening into the second fuel actuating chamber 42. The third oil inlet 48c is connected to the oil branch pipe 23, in order to be supplied by the oil coming from the second outlet 50b, close to and downstream of which is also connected this oil branch pipe 23. The fuel inlet 62 is for its part connected to the fuel branch pipe 22, the opposite end of which is connected close to and upstream of a fuel intake 64, provided on the fuel circuit 66 of the exchanger 7. In this respect, it is noted that this circuit 66 ends with a fuel exhaust 68, which sends the heated oil back to the filter 9 of the supply circuit 2.

In FIG. 3, the spool piston 26 is arranged in a normal operating position, wherein the oil pressure at the outlet of the valve 20 is very clearly higher than the fuel pressure at the inlet of the exchanger 7. This results in a hydraulic pressure in the first actuating chamber 40 that is significantly higher than the hydraulic pressure in the second actuating chamber 42, to the point that the differential pressure observed on the spool piston 26 is sufficient to fully compress the spring 44. In this normal operating position, the piston 26 is thus abutting against or close to the bottom of the sliding space 28 against which the spring 44 presses, thus reducing to a zero or low value the volume of the second fuel actuating chamber 42.

In normal operation of the assembly 200, it is therefore provided for that the oil pressure in the circuit 1' is clearly higher than the fuel pressure in the supply device 1, so that in the event of failure in the exchanger 7, there is no risk of "Fuel-in-Oil" leak. It is thanks to this differential pressure, which is applied on the spool piston 26, that the latter is pressed into the bottom of the sliding space 28, in its normal operating position. In this position, the first oil inlet and outlet 48a, 50a are each radially opposite the first annular oil passage 36 wherein they open, which enables them to communicate with one another. In addition, the second oil inlet and outlet 48b, 50b are also each radially opposite the second annular oil passage 38 wherein they open, which enables them to communicate with one another.

Therefore, the oil coming from the circuit 1' penetrates into the valve 20 via the first outlet 48a, to subsequently take the first annular oil passage 36, and be extracted from the valve via the first oil outlet 50a. The oil subsequently rejoins the intake 54 of the oil circuit 56 of the exchanger 7, within which the heat exchange occurs with the fuel circulating through the fuel circuit 66 of this same exchanger. At the outlet of the exchanger, the oil takes the exhaust 60 and the pipe 58 to rejoin the second inlet 48b of the valve 20. It subsequently circulates through the second annular oil passage 38, to be extracted from the valve by the second oil outlet 50b, from which the oil rejoins a downstream portion of the lubricating oil circuit 1'.

Figure 4:
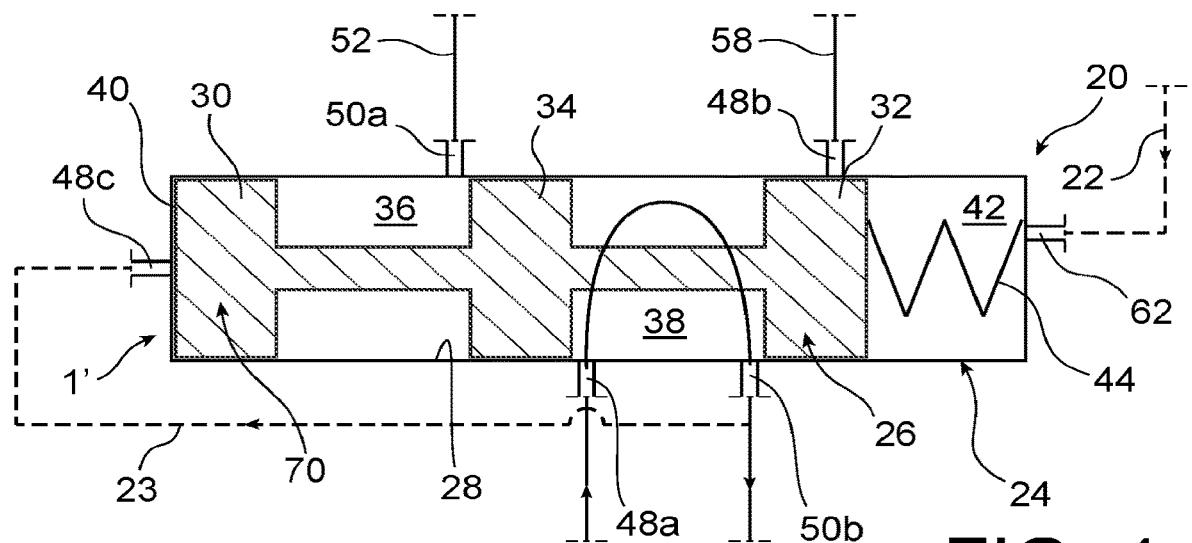
FIG. 4 is a view similar to that of FIG. 3, with the piston of the bypass valve occupying a bypass position.

The bypass valve 20 is configured so that when the differential hydraulic pressure on the piston 26 drops below a predetermined differential pressure value, this piston 26 moves from the normal operating position allowing the oil of the circuit 1' to pass through the valve 20 in the direction of the exchanger 7, as shown in FIG. 3, to a bypass position shown in FIG. 4, prohibiting this oil from circulating in the direction of the exchanger 7. FIG. 4 thus shows the bypass position of the spool piston 26, occupied following a movement of the latter, resulting from the combined action of the spring 44 and of the reduced differential pressure that is applied at the opposite ends of this piston. In this position, the piston 26 is pressed against one end opposite the sliding space 28, with the spring 44 relaxed. This movement of the piston 26 also results in a modification of the relative positions between on the one hand the oil inlets and outlets 48a, 48b, 50a, 50b, and on the other hand the annular oil passages 36, 38. Thus, this bypass position prohibits the communication between the first oil inlet and outlet 48a, 50a, and also prohibits the communication between the second oil inlet and outlet 48b, 50b. On the other hand, the first oil inlet 48a and the second oil outlet 50b are both radially opposite the second annular oil passage 38 wherein they open, which enables them to communicate with one another, and to cause the desired bypass of the exchanger 7.

The predetermined differential pressure value, leading to this change of position of the piston 26, is preferably determined in such a way as to result in an abnormal case of drop of pressure of the oil, in comparison with the pressure of the fuel. It is specified that a drop of the pressure of the oil may occur following a failure of the exchanger 7, leading to an "Oil-in-Fuel" leak. This leak is not critical so long as it does not reverse within the exchanger 7, since a reverse "Fuel-in-Oil" leak phenomenon is considered as much more severe and dangerous for the turbojet engine. Consequently, the predetermined differential pressure value is preferably determined at zero or around zero, namely at the moment or close to the moment where this differential pressure between the oil and the fuel changes sign. In such a case, the combination of the differential pressure and of the mechanical force generated by the spring indeed causes the piston 26 to move towards its bypass position.

Thanks to this possibility of isolating the exchanger 7 just before or when the fuel pressure equalises with that of the oil, the risk of "Fuel-in-Oil" leak in the exchanger is advantageously contained. In this respect, it is reminded that the presence of the spring 44, and above all the possibility of freely determining its calibration, advantageously makes it possible to cause the passive switching of the valve 20 at the desired instant. If this instant preferably coincides with a situation of equalisation of the oil and fuel pressures, or a situation similar to the latter, the calibration of the spring may alternatively be determined to cause the switching of the valve 20 at the very moment that the oil still has a pressure substantially higher than that of the fuel in at least one portion of the exchanger.

Thus, when the predetermined differential pressure value is observed on the piston 26, this immediately causes the latter to move into its bypass position, enabling the oil to bypass the exchanger 7 and thus prevent its risk of contamination by the fuel. From this instant of switching of the passive valve 20, the pilot may be informed of the status of this valve, and then have a given reaction time, for example in the order of 5 minutes, to make a decision of the type return to slowing down and/or stopping the engine in full flight. This information may be delivered to the pilot thanks to a sensor 70 of the position of the piston 26 in the sliding space 28 of the valve 20.

Figure 5:
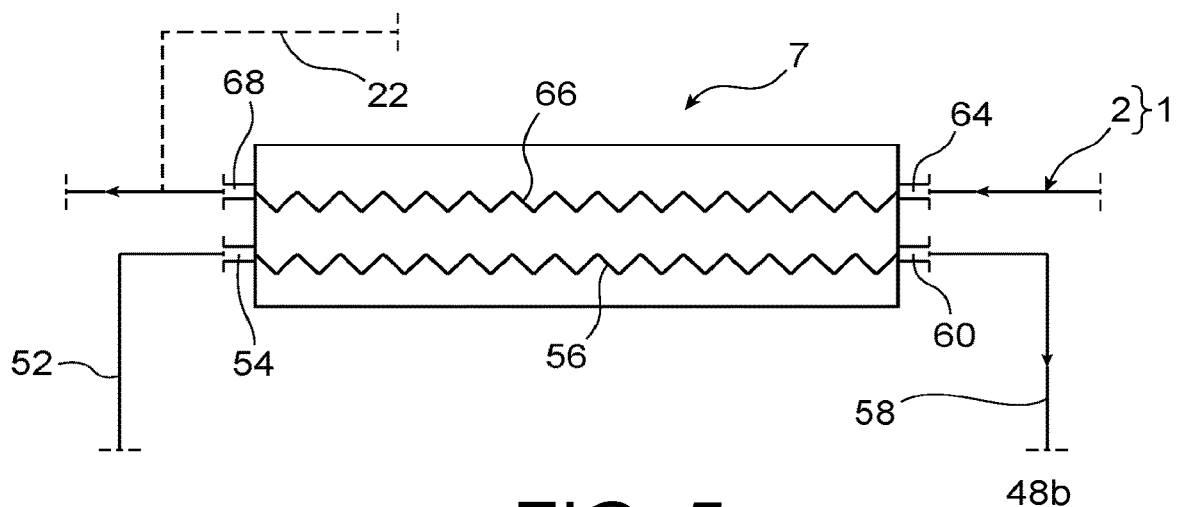
FIG. 5 is a schematic view of the exchanger, showing a fuel branch connection different from that of the embodiment of FIGS. 2 to 4.

The oil and fuel branch connections described above may differ. For example, the fuel branch pipe 22 may be connected close to or downstream of the fuel exhaust 68, as shown in FIG. 5.

Other modifications may be made by the person skilled in the art to the invention that has just been described, by way of non-limiting examples only, the scope of which is delimited by the appended claims.

The invention claimed is:

1. An aircraft turbine engine assembly, comprising:
   a lubricating oil circuit;
   a fuel supply device;
   a fuel/oil heat exchanger that is in common with the lubricating oil circuit and the fuel supply device; and
   a passive bypass valve enabling a lubricating oil of the lubricating oil circuit to bypass the fuel/oil heat exchanger, the passive bypass valve comprising a valve body and a piston configured to be movable in a sliding space formed in the valve body, the sliding space and a first side of the piston defining a first actuating chamber supplied with the lubricating oil from the lubricating oil circuit, and the sliding space and a second side of the piston defining a second actuating chamber supplied with a fuel from the fuel supply device,
   the piston of the passive bypass valve being configured to have a normal operating position allowing the lubricating oil of the lubricating oil circuit to flow to the fuel/oil heat exchanger via the passive bypass valve and a bypass position prohibiting the lubricating oil of the lubricating oil circuit from flowing to the fuel/oil heat exchanger, and when a pressure difference between an oil pressure of the lubricating oil in the first actuating chamber and a fuel pressure of the fuel in the second actuating chamber drops below a predetermined pressure difference value, the piston moves from the normal operating position to the bypass position.

2. The aircraft turbine engine assembly according to claim 1, wherein the passive bypass valve further includes an elastic return means forcing the piston towards the bypass position.

3. The aircraft turbine engine assembly according to claim 1, wherein the passive bypass valve is a spool piston valve.

4. The aircraft turbine engine assembly according to claim 3, wherein the piston of the passive bypass valve isa spool piston, wherein the passive bypass valve comprises:
a first annular oil passage and a second annular oil passage axially separated from each other;
each of a first oil inlet and a first oil outlet fluidly connected to the sliding space of the valve body, the first oil outlet fluidly connected to an oil intake of the fuel/oil heat exchanger, and the first oil inlet and the first oil outlet fluidly connected to each other via the first annular oil passage when the spool piston moves to the normal operating position; and
each of a second oil inlet and a second oil outlet fluidly connected to the sliding space of the valve body, the second oil inlet fluidly connected to an oil exhaust of the fuel/oil heat exchanger, and the second oil inlet and the second oil outlet fluidly connected to each other via the second annular oil passage when the spool piston moves to the normal operating position; and
wherein, when the spool piston moves to the bypass position:
the first oil inlet and the first oil outlet fluidly disconnects;
the second oil inlet and the second oil outlet fluidly disconnects; and
the first oil inlet and the second oil outlet fluidly connects via the second annular oil passage.

5. The aircraft turbine engine assembly according to claim 1, wherein the passive bypass valve further includes a third oil inlet fluidly connected to the first actuating chamber, and a fuel inlet fluidly connected to the second actuating chamber.

6. The aircraft turbine engine assembly according to claim 5, wherein the fuel inlet of the passive bypass valve is fluidly connected to both of the second actuating chamber and a fuel intake of the fuel/oil heat exchanger, or the fuel inlet of the passive bypass valve is fluidly connected to both of the second actuating chamber and a fuel exhaust of the fuel/oil heat exchanger.

7. The aircraft turbine engine assembly according to claim 1, wherein the passive bypass valve further includes a position sensor for the piston in the sliding space of the valve body.

8. The aircraft turbine engine assembly according to claim 1, wherein the lubricating oil circuit further comprises at least one enclosure to be lubricated.

9. An aircraft turbine engine comprising the aircraft turbine engine assembly according to claim 1.

10. The aircraft turbine engine assembly according to claim 2, wherein the elastic return means is a compression spring.

11. The aircraft turbine engine assembly according to claim 8, wherein the at least one enclosure to be lubricated is at least one of a roller bearing enclosure or an oil enclosure of the accessory gearbox.

12. The aircraft turbine engine according to claim 9, wherein the aircraft turbine engine is a turbojet engine.

* * * * *